Feb. 22, 1938. J. GALLARDO 2,109,383
TIRE
Filed March 17, 1936
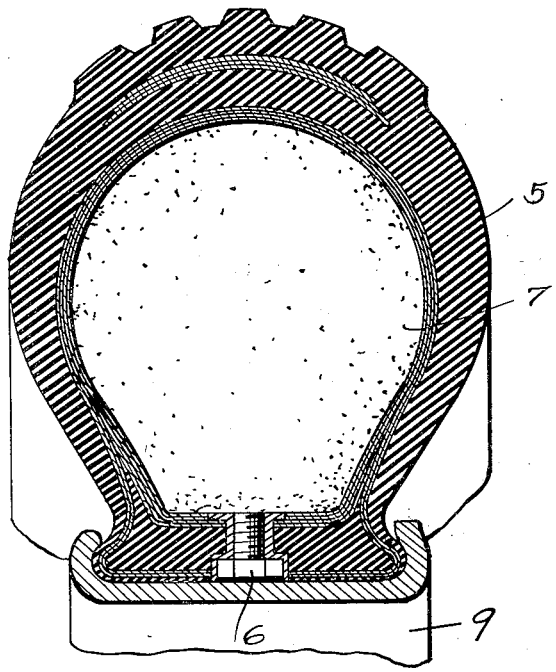
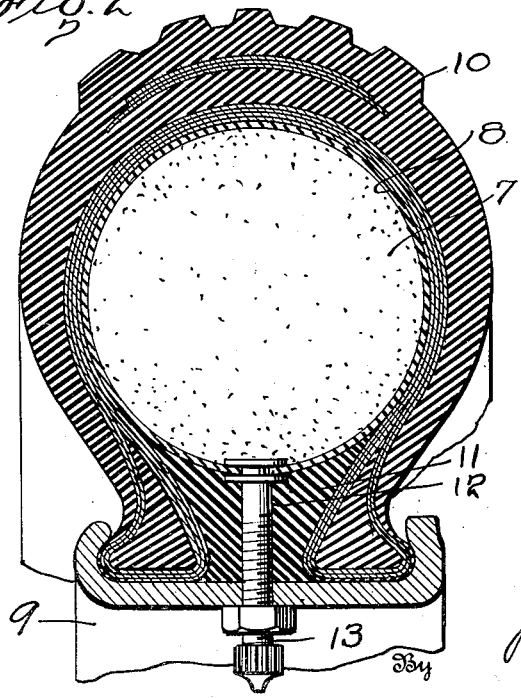
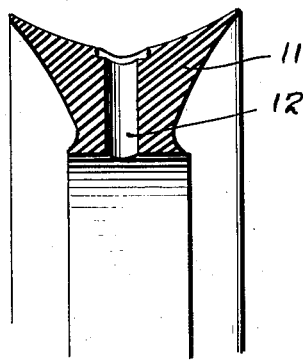
Inventor
J. Gallardo.

Patented Feb. 22, 1938

2,109,383

UNITED STATES PATENT OFFICE 2,109,383

TIRE

Jose Gallardo, Santa Tecla, El Salvador

Application March 17, 1936, Serial No. 69,372

2 Claims. (Cl. 152—13)

This invention relates to improvements in tires for vehicles of all kinds and more particularly to puncture-proof tires.

Heretofore various attempts have been made to provide tires having all of the desirable qualities of pneumatic tires, which would be puncture-proof and free from danger of blow-out, but so far as known none of these attempts has been successful either because of undesirable solidity or extremely high cost of manufacture.

The present invention contemplates the use of granular material within the tire, which has a certain amount of flow and cushioning effect under all conditions, and it is accordingly one of the objects of the present invention to provide a tire of the above general character which will have the easy riding qualities of a pneumatic tire and at the same time one which may be manufactured and assembled at minimum cost.

A further object is to provide a tire of the above character which will be free from danger of blow-out and puncture-proof in the sense that there will be no relative loss of dimensions or supporting ability when punctured, thereby maintaining substantially the same riding qualities in the tire as before.

A further object is to provide a filler for tires now in general use whereby the same outer tube or shoe may be used as is at present employed on automobiles.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features of this invention that they may embody the same by the numerous modifications in structure and relation contemplated by the invention, a drawing depicting a preferred form has been annexed as part of this disclosure, and in such drawing like characters of reference denote corresponding parts throughout all of the views, in which—

Fig. 1 is a cross sectional view of one form of tire;

Fig. 2 is a cross section illustrating another form with an inner tube having a suitable granular filler adapted to be placed within the outer shoe or casing now in general use;

Fig. 3 is a detail sectional view of a cushioning ring adapted to be interposed between the inner tube and the rim.

The invention will hereinafter be described more particularly with relation to its use as applied to automobile tires. It is of course to be understood, however, that with variations in size the invention is equally applicable to tires for use on bicycles, trucks, aeroplanes, etc.

Referring now to the drawing in detail, and more particularly to Fig. 1, the numeral 5 indicates the outer casing or shoe which is constructed in any desired manner in accordance with customary practice, that is, this tube is preferably made up of a plurality of layers of fabric with coatings of rubber to form a continuous tubular member as shown. Within this shoe 5 there is admitted, as through one or more closing opening 6, fine granular material so as to completely and solidly fill the interior of the shoe. This material is indicated by the dotted area 7 in Fig. 1.

I have found by experience that black sea sand, because of its extreme fineness and hardness, is most desirable as a filler. It is also highly resistant to pressure and mixes readily with other ingredients, preferably of a drying nature, to prevent caking. Any suitable vegetable or mineral powder may be used as such absorbent, such as powdered silica gel or anhydrous sodium sulphate. I do not wish, however, to be limited to the use of black sea sand, for lighter sands, or even other materials such as titanium oxide, are found to be suitable if they possess similar qualities of hardness and fineness.

In order to adapt the invention to tires now in general use, reference is made to Fig. 2. The usual inner tube 8 now employed may be filled with the same granular material as illustrated in Fig. 1, and this inner tube may be mounted within a split shoe 10 of standard construction as illustrated. When this arrangement is used, it is preferable and desirable to fill the inner tube with sand until it has a diameter slightly in excess of the normal diameter of the outer shoe under slight compression when the parts are assembled. This inner tube may be circular or an elongated member having overlapping ends within the shoe when assembled.

In order to maintain the circular cross section of the inner tube, there is employed a band 11 between the tube and ring 9 as illustrated in Fig. 3, which is provided with an opening 12 through which is adapted to pass the air filling stem 13 of the inner tube. Thus after the parts are assembled, as shown in Fig. 3, a small quantity of air may be injected into the inner tube to mix with the granular material and keep the same in a more nearly semi-fluid condition. In this manner the pressure or hardness of the tube may be regulated as desired within certain limits. This pressure, however, is preferably far below that normally required in pneumatic tires now in use, thus eliminating the danger of possible blow-out. If puncture should occur, no material damage is done as the filler is unlikely to leak out through any ordinary puncture opening by reason of the natural closing qualities of the rubber in the outer shoe.

It is thus seen that the present invention contemplates a relatively simple and practical tire for vehicles of all kinds which may be inexpensively manufactured and assembled. The finished tire possesses substantially the same riding qualities as pneumatic tires now in use and yet avoids the annoyances, dangers, and inconveniences resulting from punctures and blow-outs.

Without further analysis the foregoing will so fully reveal the gist of this invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claims.

I claim:

1. A tire of the character described comprising an outer shoe adapted to be mounted upon the rim of a vehicle wheel, an inner tube for said shoe having an air valve associated therewith, said inner tube being filled with hard, fine sea sand, and a powdered absorbent material intermixed therewith and combined with air under pressure.

2. A tire of the character described comprising an outer shoe adapted to be mounted upon the rim of a vehicle wheel, an inner tube for said shoe having an air valve associated therewith, said inner tube being filled with hard, fine sea sand, and an absorbent material combined with air under pressure, and a band adapted to be interposed between the rim upon which the shoe is mounted and the inner tube within the shoe thereby to maintain the circular cross-section of the inner tube.

JOSE GALLARDO.